US012507608B2

(12) United States Patent
Blunier et al.

(10) Patent No.: US 12,507,608 B2
(45) Date of Patent: Dec. 30, 2025

(54) DISC BLADE SPACING ADJUSTMENT SYSTEM

(71) Applicant: CNH Industrial America LLC, New Holland, PA (US)

(72) Inventors: Timothy Richard Blunier, Danvers, IL (US); Sven Nathaniel Setterdahl, Maquon, IL (US); Derek Sicheneder, Morton, IL (US); Raymond Wayne Garber, Roanoke, IL (US)

(73) Assignee: CNH Industrial America LLC, New Holland, PA (US)

( * ) Notice: Subject to any disclaimer, the term of this patent is extended or adjusted under 35 U.S.C. 154(b) by 489 days.

(21) Appl. No.: 18/087,072

(22) Filed: Dec. 22, 2022

(65) Prior Publication Data

US 2024/0206364 A1 Jun. 27, 2024

(51) Int. Cl.
*A01B 63/24* (2006.01)
*A01B 79/00* (2006.01)

(52) U.S. Cl.
CPC .......... *A01B 63/245* (2013.01); *A01B 79/005* (2013.01)

(58) Field of Classification Search
CPC ....... A01B 63/24; A01B 63/245; A01B 63/26; A01B 63/32; A01B 79/005
See application file for complete search history.

(56) References Cited

U.S. PATENT DOCUMENTS

| 3,080,933 | A | * | 3/1963 | Kramer | A01B 21/083 |
| | | | | | 172/582 |
| 3,191,691 | A | * | 6/1965 | Newkirk | A01B 23/046 |
| | | | | | 172/776 |
| 3,223,178 | A | * | 12/1965 | Jones | A01B 21/083 |
| | | | | | 172/600 |
| 3,637,028 | A | | 1/1972 | Fueslein et al. | |
| 3,643,743 | A | | 2/1972 | Fueslein | |
| 5,078,216 | A | * | 1/1992 | Dick | A01B 49/022 |
| | | | | | 172/582 |
| 6,935,435 | B1 | | 8/2005 | Shenk | |
| 8,746,361 | B2 | * | 6/2014 | Hake | A01B 63/002 |
| | | | | | 172/581 |
| 9,668,399 | B2 | * | 6/2017 | Gates | A01B 63/245 |
| 10,893,643 | B2 | * | 1/2021 | Redekop | A01B 15/20 |
| 11,277,955 | B2 | | 3/2022 | Henry | |
| 11,330,754 | B2 | | 5/2022 | Foster et al. | |

(Continued)

FOREIGN PATENT DOCUMENTS

CN 111096109 5/2020
CN 211831732 11/2020

*Primary Examiner* — Matthew R Buck
(74) *Attorney, Agent, or Firm* — Fletcher Yoder, P.C.

(57) ABSTRACT

An agricultural implement includes a main frame, a first frame member assembly coupled to the main frame, and a first plurality of discs coupled to the first frame member assembly. The agricultural implement also includes a first linkage assembly coupled to the first frame member assembly. The agricultural implement further includes a first lateral adjustment mechanism coupled to the first frame member assembly and configured to actuate the first linkage assembly to change a first lateral position of the first plurality of discs relative to at least one other plurality of discs coupled to the main frame or relative to a center line of the main frame, the center line being parallel to a direction of travel of the agricultural implement.

19 Claims, 5 Drawing Sheets

(56) References Cited

U.S. PATENT DOCUMENTS

| | | |
|---|---|---|
| 11,357,156 B2 | 6/2022 | Harmon et al. |
| 2018/0325010 A1* | 11/2018 | Connell ............... A01B 69/004 |
| 2020/0053945 A1* | 2/2020 | Becker ................ A01B 63/245 |
| 2020/0305334 A1 | 10/2020 | Forbes et al. |
| 2021/0092894 A1 | 4/2021 | Forbes et al. |
| 2021/0315146 A1* | 10/2021 | Hake ................... A01B 29/048 |

* cited by examiner

FIG. 5

DISC BLADE SPACING ADJUSTMENT SYSTEM

BACKGROUND OF THE INVENTION

The present disclosure relates generally to a disc blade spacing adjustment system for an agricultural implement.

Certain agricultural implements include ground engaging tools configured to interact with soil. For example, a tillage implement may include tillage points and/or disc blades configured to break up the soil for subsequent planting or seeding operations. In certain tillage implements, the disc blades are arranged in rows or gangs of discs that are pulled through the soil at various depths to break up clods or lumps of soil, as well as old plant material to provide a more amenable soil structure for planting and to level the soil surface. The configuration of the tilling implement gangs and their constituent discs will affect the quality and quantity of passes required to effectively till an area of soil. In typical adjustable angle style vertical tillage machines the relationship of the lateral spacing between the front and rear disc blade gangs changes as an angle is adjusted. Also, the blade type or style and spacing may limit the speed of the typical disc style machine to a narrow field speed range.

SUMMARY OF THE INVENTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, an agricultural implement is provided. The agricultural implement includes a main frame, a first frame member assembly coupled to the main frame, and a first plurality of discs coupled to the first frame member assembly. The agricultural implement also includes a first linkage assembly coupled to the first frame member assembly. The agricultural implement further includes a first lateral adjustment mechanism coupled to the first frame member assembly and configured to actuate the first linkage assembly to change a first lateral position of the first plurality of discs relative to at least one other plurality of discs coupled to the main frame or relative to a center line of the main frame, the center line being parallel to a direction of travel of the agricultural implement.

In certain embodiments, a system for altering a position of a disc gang is provided. The system includes a frame member assembly configured to couple to a main frame of an agricultural implement, the main frame having a front portion and a rear portion relative to a direction of travel of the agricultural implement. The system also includes the disc gang including a plurality of discs, wherein the disc gang is coupled to the frame member assembly. The system further includes a linkage assembly coupled to the frame member assembly and an angular adjustment mechanism configured to change an angle of the disc gang relative to the front portion or the rear portion of the main frame. The system still further includes sensors configured to detect a spatial relationship of the disc gang relative to at least one other disc gang coupled to the main frame. The system yet further includes a controller configured to alter the spatial relationship of the disc gang relative to the at least one other disc gang during operation of the agricultural implement based on feedback from the sensors. The system further includes a lateral adjustment mechanism coupled to the frame member assembly and configured to actuate the linkage assembly to change a lateral position of the disc gang relative to at least one other disc gang coupled to the main frame or relative to a center line of the main frame, the center line being parallel to the direction of travel of the agricultural implement. The lateral adjustment mechanism is configured to maintain the lateral position of the disc gang relative to the at least one other disc gang or relative to the center line as the angle of the disc gang is changed over a range of different angles in response to control signals from the controller based on the feedback from the sensors.

In certain embodiments, a method for altering a position of a disc gang on an agricultural implement. The method includes changing, via a lateral adjustment mechanism, a lateral position of the disc gang relative to at least one other disc gang on the agricultural implement or relative to a center line of a main frame of the agricultural implement, the center line being parallel to a direction of travel of the agricultural implement, wherein the lateral adjustment mechanism is coupled a frame member assembly, the disc gang is coupled to the frame member assembly, and the disc gang includes a plurality of discs. The method also includes altering, via an angular adjustment mechanism, an angle of the disc gang relative to a front portion or a rear portion of the main frame while the lateral adjustment mechanism maintains the lateral position of the disc gang relative to the at least one other disc gang or relative to the center line as the angle of the disc gang is changed over a range of different angles in response to control signals from a controller based on feedback from sensors detecting a spatial relationship of the disc gang relative to at least one other disc gang coupled to the main frame, wherein the controller is configured to alter the spatial relationship of the disc gang relative to the at least one other disc gang during operation of the agricultural implement based on feedback from the sensors.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure is generally directed to an adjustment system (e.g., disc blade adjustment system) that enables disc gang spacing to be adjusted wider or narrower across a width of a full machine disc gang system. In particular, the adjustment system (e.g., via one or more linkage connections on one or more sets of gangs) enables a position (e.g., lateral position) of certain gangs on the agricultural implement to be adjusted laterally relative to other corresponding gangs on the agricultural implement and/or relative to a center line of the agricultural implement (which is parallel to a direction of travel of the agricultural implement). The adjustment system also maintains this lateral position and special relationship (e.g., relative to the other gangs and/or the centerline of the agricultural implement) as an angle of the gang is adjusted over a range of different angles. In certain embodiments, the adjustment system may be applied to a plurality of discs individually coupled or mounted to the same frame member assembly (as opposed to a disc gang).

Figure 1:
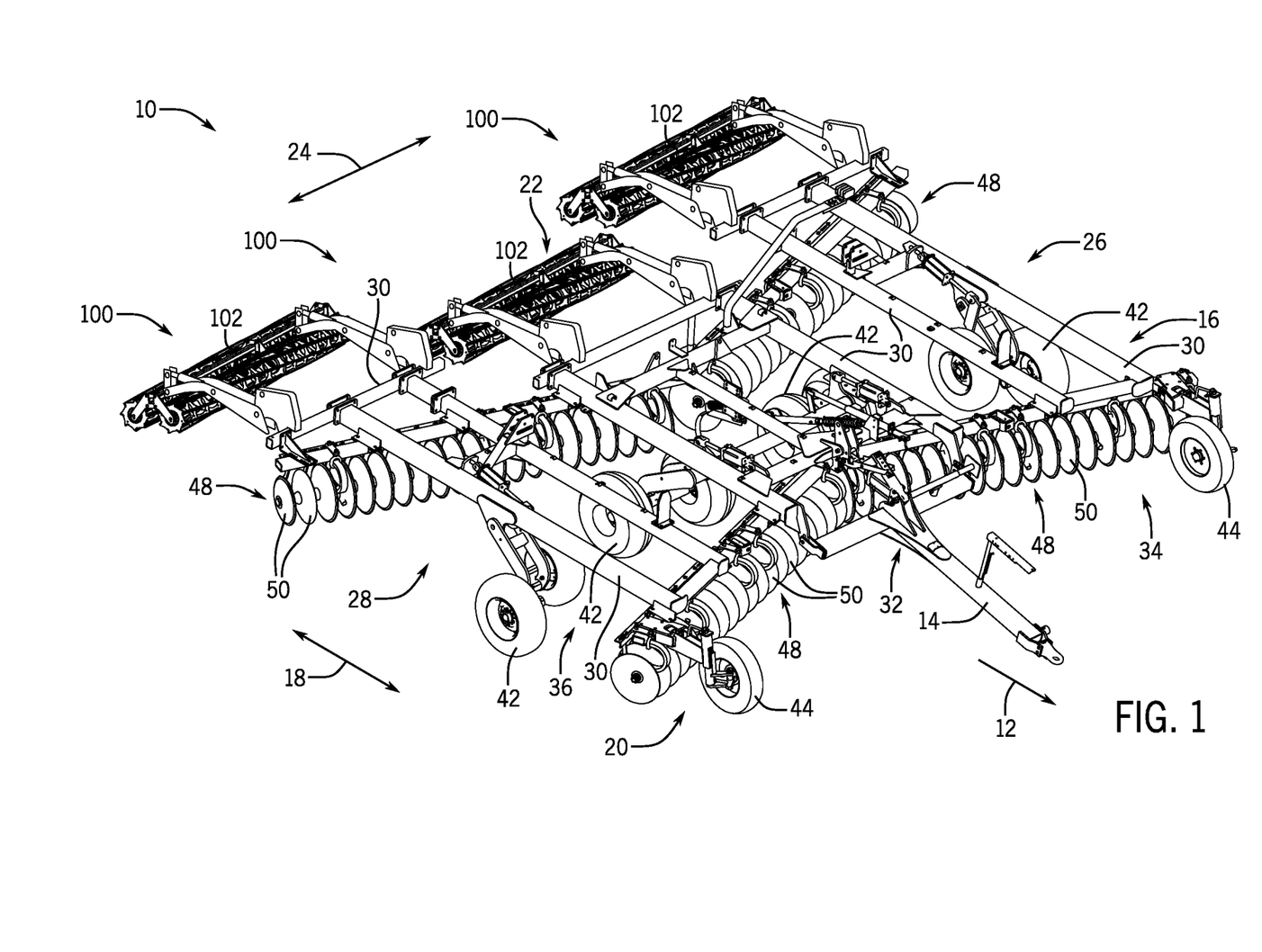
FIG. 1 is a perspective view of an agricultural implement, in accordance with aspects of the present disclosure.

Referring now to the drawings, FIG. 1 illustrates a perspective view of an embodiment of an agricultural implement 10. In general, the implement 10 may be configured to be towed along a forward direction of travel 12 by a work vehicle (not shown), such as a tractor or other agricultural work vehicle. For example, the work vehicle may be coupled to the implement 10 via a hitch assembly 14 or using any other suitable attachments means. As shown, the hitch assembly 14 may be coupled to a frame 16 of the implement 10 to facilitate towing the implement 10 in the direction of travel 12.

As shown, the frame 16 may extend in a longitudinal direction (e.g., as indicated by arrow 18 in FIG. 1) between a forward end 20 and an aft or rear end 22. The frame 16 may also extend in a lateral direction (e.g., as indicated by arrow 24 in FIG. 1) between a first side 26 and a second side 28. In addition, the frame 16 may generally include a plurality of structural frame members 30, such as beams, bars, and/or the like, configured to support or couple to a plurality of components.

In several embodiments, the frame 16 may include one or more sections. For example, as shown, in the illustrated embodiment, the frame 16 may include a main or center section 32 positioned centrally between the first and second sides 26, 28 of the frame 16. The frame 16 may also include a first wing section 34 positioned adjacent to the first side 26 of the frame 16. Similarly, the frame 16 may also include a second wing section 36 positioned adjacent to the second side 28 of the frame 16. The first and second wing sections 34, 36 may be pivotably coupled to the main section 32 of the frame 16. In this respect, the first and second wing sections 34, 36 may be configured to fold up relative to the main section 32 to reduce the lateral width of the implement 10 to permit, for example, storage or transportation of the implement 10 on a road. However, in other embodiments, the frame 16 may include any suitable number of frame sections.

The implement 10 may further include various wheel assemblies coupled to the frame 16 to support the frame 16 relative to the ground and to facilitate towing the implement 10 in the direction of travel 12. Specifically, in several embodiments, the implement 10 may include a plurality of center support wheel assemblies 42 located centrally on the frame 16 between its forward and aft ends 20, 22, with the wheel assemblies 42 being spaced apart from one another in the lateral direction 24 of the implement 10 between its first and second sides 26, 28. In addition, the implement 10 may also include a plurality of forward support wheel assemblies 44 coupled to the frame 16 adjacent to the forward end 20 of the frame 16, with the wheel assemblies 44 being spaced apart from one another in the lateral direction 24 of the implement 10 between its first and second sides 26, 28. As shown in FIG. 1, the forward support wheel assemblies 44 may be spaced apart from the center support wheel assemblies 42 in the longitudinal direction 18 of the implement 10. It should be appreciated that the implement 10 may include any suitable number and/or type of wheel assemblies in alternate embodiments.

Referring still to FIG. 1, the implement 10 may also include a plurality of ground-engaging tools supported by the frame 16. For example, in several embodiments, the frame 16 may be configured to support one or more gangs or sets 48 of disc blades 50 adjacent its forward end or portion 20 and adjacent its aft end or portion 22. In such embodiments, each disc blade 50 may, for example, include both a concave side (not shown) and a convex side (not shown). Furthermore, the gangs 48 of disc blades 50 may be oriented at an angle relative to the travel direction 12 to promote more effective tilling of the soil. Additionally, as shown, in one embodiment, the implement 10 may also include one or more finishing assemblies 100, wherein the frame 16 may be configured to support the finishing assemblies 100 adjacent to its aft end 20. Each finishing assembly 100 may include a pair of rolling baskets 102, which may, in turn, be configured to reduce the number of clods in the soil and/or firm the soil over which the implement 10 travels.

Figure 2:
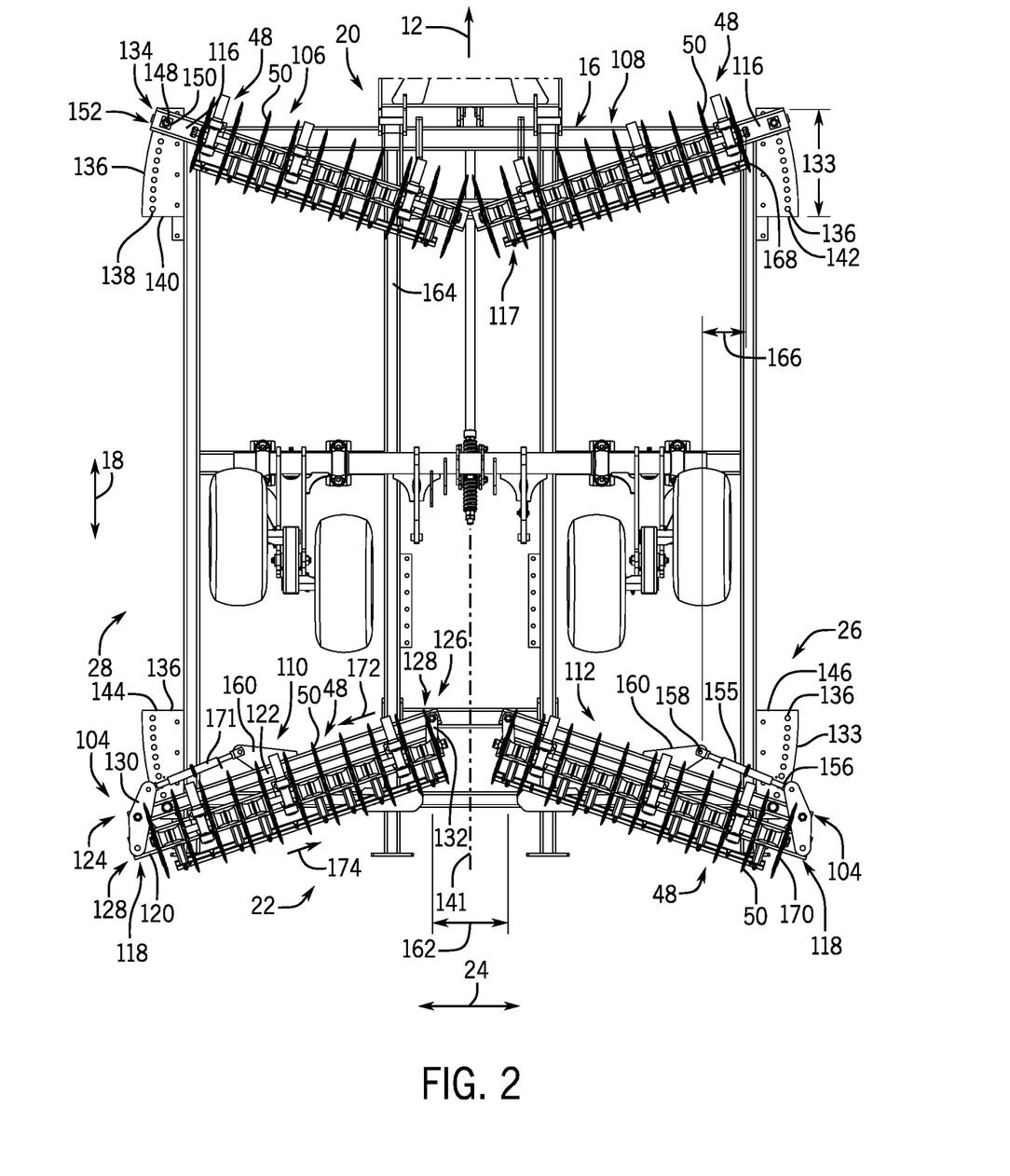
FIG. 2 is a bottom view of a portion of an agricultural implement having a disc blade space adjustment system, in accordance with aspects of the present disclosure.

It should be appreciated that, in addition to the gangs 48 of disc blades 50 and the rolling baskets 102 of the finishing assemblies 100 shown in FIGS. 1 and 2 (or as an alternative thereto), the implement 10 may include any other suitable ground-engaging tools. For instance, if the implement 10 is configured as a cultivator or ripper, the implement 10 may include a plurality shanks, harrow tines, leveling blades, and/or the like.

It should be appreciated that the configuration of the implement 10 described above and shown in FIG. 1 is provided only to place the present subject matter in an exemplary field of use. Thus, it should be appreciated that the present subject matter may be readily adaptable to any manner of implement configuration.

FIG. 2 is a bottom view of a portion of the agricultural implement 10 having a disc blade space adjustment system 104. Some of the components (e.g., wheels, finishing assemblies, etc.) of the agricultural implement 10 are removed for simplification. As depicted, the agricultural implement 10 includes 4 gangs 48 of disc blades 50 (e.g., gangs 106, 108, 110, and 112) coupled to the frame 16 (e.g., main frame) in an X-configuration. The gangs 48 of disc blades 50 (e.g., gangs 106 and 108) are generally aligned in the lateral direction 24 (e.g., at a same longitudinal or axial location along a center line 114 of the agricultural implement 10) adjacent the front portion 20 of the agricultural implement 10. The gangs 48 of disc blades 50 (e.g., gangs 110 and 112) are generally aligned in the lateral direction 24 (e.g., at a same longitudinal or axial location along the center line 114) adjacent the aft end 22 of the agricultural implement 10. The number of gangs 48 of disc blades 50 coupled to the frame 16 and the configuration of the gangs 48 of disc blades 50 may vary.

The disc blades 50 of the gangs 106, 108, 110, and 112 are indexed. In particular, the disc blades 50 of the gangs 106 and 108 are respectively aligned with the disc blades 50 of the gangs 110 and 112 such that areas between the disc blades 50 in the gangs 106 and 108 are respectively engaged by the disc blades 50 in the gangs 110 and 112 as the agricultural implement 10 is pulled forward.

As depicted, the gangs 106 and 108 are each coupled to respective frame members 116. A longitudinal end 117 of each frame member 116 is pivotably coupled to frame 16. The gangs 110 and 112 are each coupled to a frame member assembly 118. Each frame member assembly 118 includes a first frame member 120 and a second frame member 122 in parallel relationship with each other along a horizontal plane that extends in both the longitudinal direction 18 and the lateral direction 24 along the frame 16. The gangs 110 and 112 are coupled to a respective first frame member 120. Each frame member assembly 118 includes a first longitudinal end 124 and a second longitudinal end 126. The first frame member 120 and the second frame member 122 are pivotably coupled to each other via a linkage assembly 128. The linkage assembly 128 includes a first linkage connector 130 pivotably coupling the first frame member 120 and the second frame member 122 at the first longitudinal end 124. The linkage assembly 128 also includes a second linkage connector 132 pivotably coupling the first frame member 120 and the second frame member 122 at the second longitudinal end 126. The second frame member 122 of each frame member assembly 118 is pivotably coupled to the frame 16 at the second longitudinal end 126.

The angle of the gangs 48 (and also their respective disc blades 50) may be adjusted (e.g., over a range of different angles as indicated by arrows 133) relative to the center line 114 or the direction of travel 12 (or relative to the front end 20 or the aft end 22). In particular, a respective angular adjustment mechanism 134 is utilized to change the angle of the gangs 48. Each angular adjustment mechanism 134 includes a wedge plate 136 that enables the angle of the gangs 48 to be changed manually. The wedge plate 136 includes a plurality of different openings 138 representing different angular positions. Wedge plates 140, 142, 144, and 146 associated with the gangs 106, 108, 110, and 112, respectively. The wedge plates 140, 142 are located on the sides 28 and 26, respectively, of the frame 16 adjacent the front end 20. The wedge plates 144, 146 are located the sides 28, 26, respectively, of the frame 16 adjacent the aft portion 22. The wedge plates 136 extends in the lateral direction 24 away from the frame 16. The angular adjustment mechanism 134 sets the position of the gang 48 by passing a pin 148 through both the opening 138 (e.g., associated with the desired angle) in the wedge plate 136 and an opening adjacent a longitudinal end of a frame member associated with a respective gang 48. For example, each frame member 116 coupled to the gangs 106 and 108 includes an opening 150 on a longitudinal end 152 (e.g., opposite longitudinal end 117. Each frame member 122 of the frame member assembly 118 includes an opening 154 adjacent the longitudinal end 124 (e.g., adjacent to the linkage connector 130).

The disc blade space adjustment system 104 includes a lateral adjustment mechanism 155 associated with each gang 110, 112 adjacent the aft end 22. In certain embodiments, a lateral adjustment mechanism 155 may be associated with each gang 106, 108 adjacent the front end 20. As depicted, the lateral adjustment mechanism 155 is a turnbuckle. In certain embodiments, the lateral adjustment mechanism 155 may be a cylinder or another type of actuator. A first end 156 of the lateral adjustment mechanism 155 is coupled to the linkage connector 130. A second end 158 of the lateral adjustment mechanism 155 is coupled to a linkage connector 160 coupled to the frame member 122 of the frame member assembly 118.

The lateral adjustment mechanism 155 of the respective gangs 110 and 112 is configured to actuate the linkage assembly 128 to change a lateral position of the respective gang 110 and 112 relative to at least one other gang 48 (or all of the gangs 48) and/or the center line 114. For example, the lateral position of the gang 110, the lateral position of the gang 112, and/or the respective lateral positions of both of the gangs 110, 112 may be adjusted to alter a gap (e.g., center gap, as indicated by arrow 162) between the gangs 110, 112. Altering the lateral position of the gang 110 also alters the index (e.g., front/rear index) between the disc blades 50 of the gang 110 and the disc blades 50 of the gang 106 as indicated by arrow 164. Similarly, altering the lateral position of the gang 112 alters the index (e.g., front/rear index) between the disc blades 50 of the gang 112 and the blades of the gang 108. Further, altering the lateral position of the gang 112 alters the blade overlap (as indicated by arrows 166) between the disc blades 50 of the gangs 108 and 112, for example, as depicted between a disc blade 168 of the gang 108 closet to the side 26 and a disc blade 170 of the gang 112 closest to the side 26. Similarly, altering the lateral position of the gang 110 alters the blade overlap between the disc blades 50 of the gangs 106 and 110.

The lateral adjustment mechanism 155 extends and retracts as indicated by arrow 171 to move the linkage connector 130 relative to the linkage connector 160. The lateral adjustment mechanism 155 is configured to shift the frame member 120 laterally relative to the frame member 122. In particular, the lateral adjustment mechanism 155 is configured to shift the frame member 120 in a first direction 172 and to shift the frame member 122 in a second direction 174 (opposite the first direction 172) and vice versa. In certain embodiments, the lateral adjustment mechanism 155 may be operated manually. In certain embodiments, the lateral adjustment mechanism 155 may be operated automatically.

Figure 3:
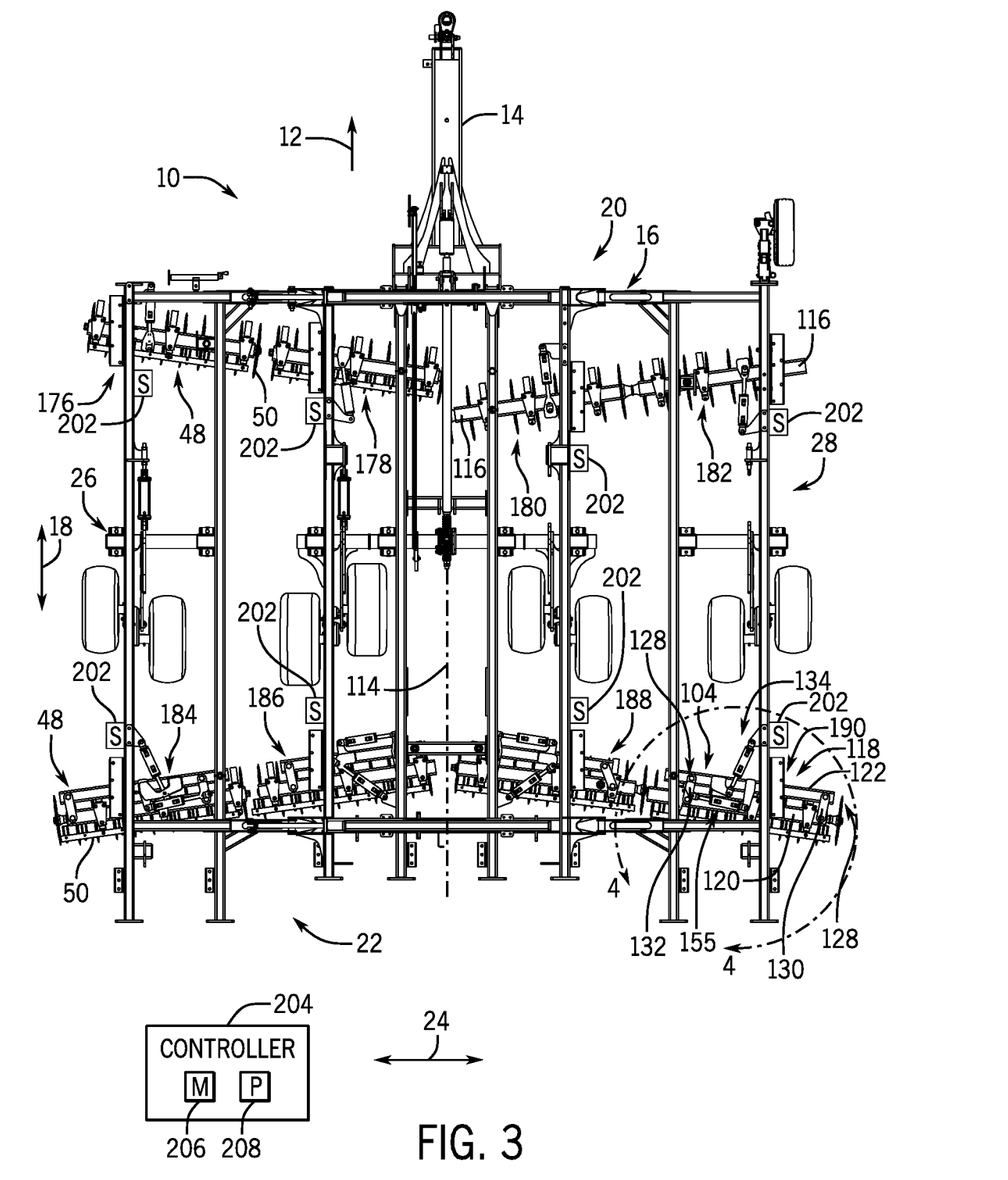
FIG. 3 is a top view of an agricultural implement having a disc blade space adjustment system, in accordance with aspects of the present disclosure.
Figure 4:
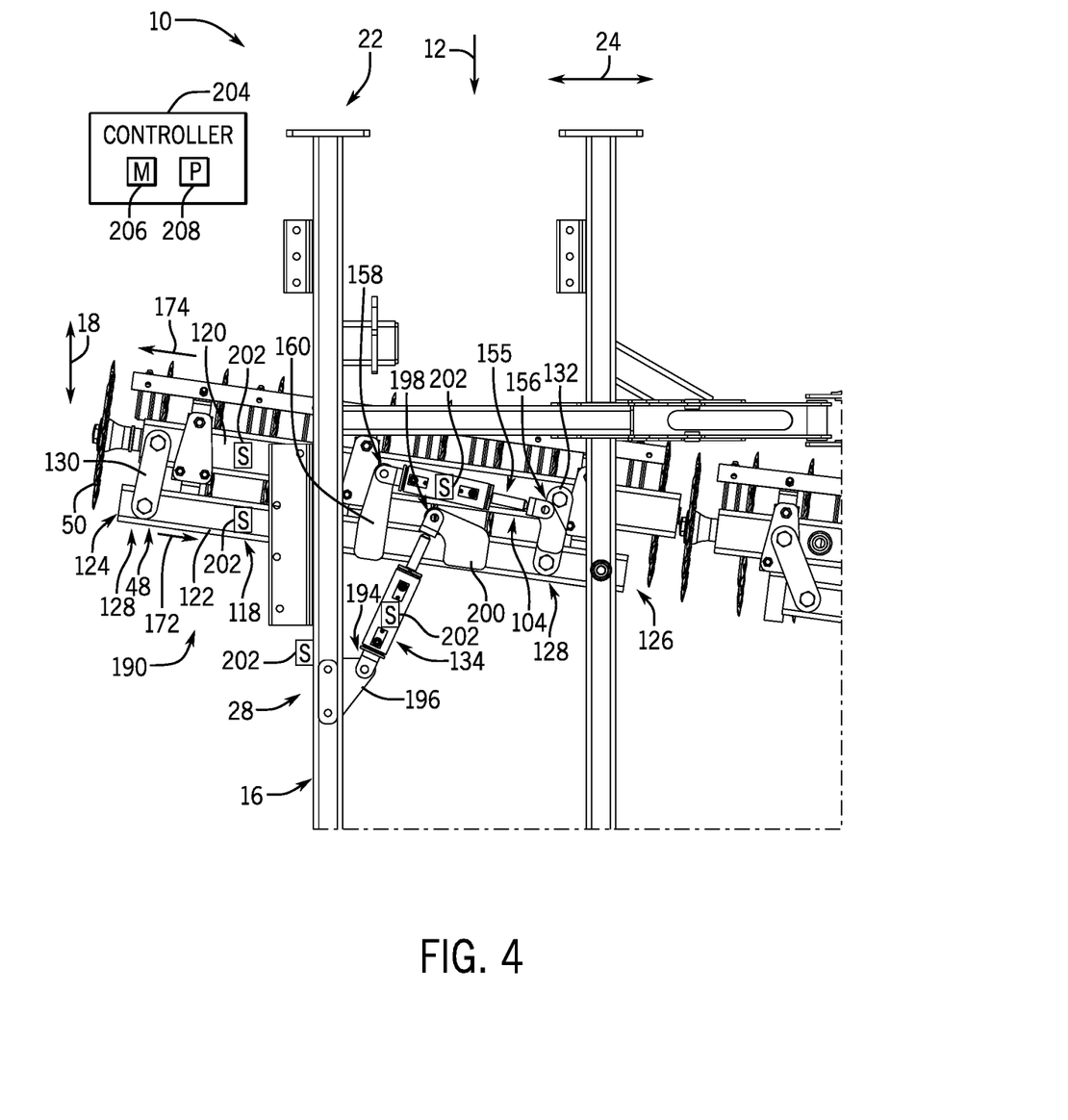
FIG. 4 is a top view of a portion of the agricultural implement in FIG. 3, taken within line 4-4, in accordance with aspects of the present disclosure.

FIGS. 3 and 4 are top views of another agricultural implement 10 having the disc blade space adjustment system 104. Some of the components of the agricultural implement 10 are removed for simplification. As depicted, the agricultural implement 10 includes 8 gangs 48 of disc blades 50 (e.g., gangs 176, 178, 180, 182, 184, 186, 188, and 190) coupled to the frame 16 (e.g., main frame). The gangs 48 of disc blades 50 (e.g., gangs 176, 178, 180, and 182) are generally aligned in the lateral direction 24 (e.g., at a same longitudinal or axial location along a center line 114 of the agricultural implement 10) adjacent the front end 20 of the agricultural implement 10. The gangs 48 of disc blades 50 (e.g., gangs 184, 186, 188, and 190) are generally aligned in the lateral direction 24 (e.g., at a same longitudinal or axial location along the center line 114) adjacent the aft end 22 of the agricultural implement 10. The number of gangs 48 of disc blades 50 coupled to the frame 16 and the configuration of the gangs 48 of disc blades 50 may vary.

The disc blades 50 of the gangs 176, 178, 180, 182, 184, 186, 188, and 190 are indexed. In particular, the disc blades 50 of the gangs 176, 178, 180, 182 are respectively aligned with the disc blades 50 of the gangs 184, 186, 188, and 190 such that areas between the disc blades 50 in the gangs 176, 178, 180, and 182 are respectively engaged by the disc blades 50 in the gangs 184, 186, 188, and 190 as the agricultural implement 10 is pulled forward.

As depicted, the gangs 176, 178, 180, and 182 are each coupled to respective frame members 116. Each frame member 116 is pivotably coupled to the frame 16. The gangs 184, 186, 188, and 190 are each coupled to the frame member assembly 118. Each frame member assembly 118 includes the first frame member 120 and the second frame member 122 in parallel relationship with each other along a horizontal plane that extends in both the longitudinal direction 18 and the lateral direction 24 along the frame 16. The gangs 184, 186, 188, and 190 are coupled to a respective first frame member 120. Each frame member assembly 118 includes the first longitudinal end 124 and the second longitudinal end 126. The first frame member 120 and the second frame member 122 are pivotably coupled to each other via the linkage assembly 128. The linkage assembly 128 includes the first linkage connector 130 pivotably coupling the first frame member 120 and the second frame member 122 at the first longitudinal end 124. The linkage assembly 128 also includes the second linkage connector 132 pivotably coupling the first frame member 120 and the second frame member 122 at the second longitudinal end 126. The second frame member 122 of each frame member assembly 118 is pivotably coupled to the frame 16 at the second longitudinal end 126.

The angle of the gangs 48 (and also their respective disc blades 50) may be adjusted (e.g., over a range of different angles) relative to the center line 114 or the direction of travel 12 (or relative to the front end 20 or the rear end 22). In particular, a respective angular adjustment mechanism 134 is utilized to change the angle of the gangs 48. Each angular adjustment mechanism 134 includes a cylinder 192 to actuate the change in the angle of the gangs 48. A first end 194 of the cylinder 192 is coupled to the frame 16 via a linkage connector 196. The second end 198 of the cylinder 192 is coupled to the frame member 122 of the frame member assembly 118 via a linkage connector 200 coupled to the frame member 122. In certain embodiments, the angular adjustment mechanism 134 may be configured to automatically adjust the angle of the gangs 48 (e.g., via received control signals). In certain embodiments, the angular adjustment mechanism 134 may be actuated manually to adjust the angle of the gangs 48.

The disc blade space adjustment system 104 includes the lateral adjustment mechanism 155 associated with each gang 184, 186, 188, and 190 adjacent the aft end 22. In certain embodiments, a lateral adjustment mechanism 155 may be associated with each gang 176, 178, 180, and 182 adjacent the front end 20. As depicted, the lateral adjustment mechanism 155 is a cylinder. In certain embodiments, the lateral adjustment mechanism 155 may be a turnbuckle or another type of actuator. The first end 156 of the lateral adjustment mechanism 155 is coupled to the linkage connector 132. The second end 158 of the lateral adjustment mechanism 155 is coupled to the linkage connector 160 coupled to the frame member 122 of the frame member assembly 118.

The lateral adjustment mechanism 155 of the respective gangs 184, 186, 188, and 190 is configured to actuate the linkage assembly 128 to change a lateral position of the respective gang 184, 186, 188, and 190 relative to at least one other gang 48 (or all of the gangs 48) and/or the center line 114. For example, the lateral position of any of the gangs 184, 186, 188, and 190 and/or the respective lateral positions of each of the gangs 184, 186, 188, and 190 may be adjusted to alter a gap (e.g., center gap) between adjacent gangs 184, 186, 188, and 190 (e.g., center gap between gangs 184 and 186, center gap between gangs 186 and 188, and/or the center gap between the gangs 188 and 190). Altering the lateral position of any of the gangs 184, 186, 188, and 190 also alters the index (e.g., front/rear index) between the disc blades 50 of the gangs 184, 186, 188, and 190 and the corresponding disc blades 50 of the corresponding gangs 176, 178, 180, and 182. In addition, altering the lateral position of any of the gangs 184, 186, 188, and 190 alters the blade overlap with corresponding disc blades 50 of the corresponding gangs 176, 180, 188, and 190.

The lateral adjustment mechanism 155 is configured to shift the frame member 120 laterally relative to the frame member 122. In particular, the lateral adjustment mechanism 155 is configured to shift the frame member 120 in the first direction 172 and to shift the frame member 122 in the second direction 174 (opposite the first direction 172) and vice versa. In certain embodiments, the lateral adjustment mechanism 155 may be configured to automatically adjust the lateral position of the gangs 48 (e.g., via received control signals). In certain embodiments, the lateral adjustment mechanism 155 may be actuated manually to adjust the lateral position of the gangs 48.

In certain embodiments, sensors 202 may disposed throughout the agricultural implement 10. For example, the sensors 202 may be disposed on the frame 16 adjacent the gangs 48, on the frame member 120 and/or the frame member 122 of the frame member assembly 118, on the angular adjustment mechanism 134, on the lateral adjustment mechanism, and/or on another component of the agricultural implement 10. In certain embodiments, some of the sensors 202 are configured to detect an angle of the gangs 48 (as well as disc blades). In certain embodiments, some of the sensors 202 are configured to detect a lateral position of the gangs 48. In certain embodiments, some of the sensors 202 are configured to detect a spatial relationship of the gangs 48 relative to each other. In certain embodiments, some of the sensors 202 are configured to detect a height between the agricultural implement 10 and the soil. For example, the sensors 202 may include position sensors (e.g., Hall-effect linear-displacement transducer, magnetostrictive transducer, etc.), pressure sensors, infrared sensors, radio detection and ranging sensors, light detection and ranging (lidar) sensors, ultrasonic sensors, capacitance sensors, and/or other types of sensors 202.

In certain embodiments, a controller 204 is communicatively coupled to the sensors 202, the lateral adjustment mechanisms 155, and/or the angular adjustment mechanisms 134. The controller 204 may be part of the agricultural implement 10, a work vehicle towing the agricultural implement 10, or remote from both the agricultural implement 10 and the work vehicle. The controller 204 receives feedback from the sensors 202. The controller 204 also provides control signals the lateral adjustment mechanisms 155 and/or the angular adjustment mechanisms 134. The controller 204 is configured to provide control signals (e.g., to the lateral adjustment mechanisms 155 and/or the angular adjustment mechanisms 134) to automatically alter the spatial relationship of the gangs 48 relative to each other based on the feedback from the sensors 202. Also, the controller 204 is configured to provide controls signals (e.g., to the lateral adjustment mechanisms 155) to automatically alter a lateral position of one or more of the gangs 48 based on feedback from the sensors 202. Further, the controller 204 is configured to provide control signals (e.g., to the angular adjustment mechanisms 134) to automatically alter an angle of one or more of the gangs 48 (and their disc blades 50) based on feedback from the sensors 202. The controller 204 is configured to alter the spatial relationship of the gangs 48, the angles of the gangs 48, and/or the lateral positions of the gangs 48 during operation of the agricultural implement 10 (e.g., as the agricultural implement 10 is being utilized in the field). In certain embodiments, the controller 204 is configured to simultaneously control a speed of the agricultural implement 10, an angle and lateral positions of the gangs 48, and a seedbed floor and/or output levelness during tillage (i.e., during operation of the agricultural implement 10). In addition, the adjustments enabled by the lateral adjustment mechanisms 155 and the angular adjustment mechanisms 134 enable the agricultural implement to operate over a greater field speed range.

The controller 204 may include a memory 206 and a processor 208. In some embodiments, the processor 208 may include one or more general purpose processors, one or more application specific integrated circuits, one or more field programmable gate arrays, or the like. Additionally, the memory 206 may be any tangible, non-transitory, computer readable medium that is capable of storing instructions executable by the processor 208 and/or data that may be processed by the processor 208. In other words, the memory 206 may include volatile memory, such as random access memory, or non-volatile memory, such as hard disk drives, read only memory, optical disks, flash memory, and the like.

Figure 5:
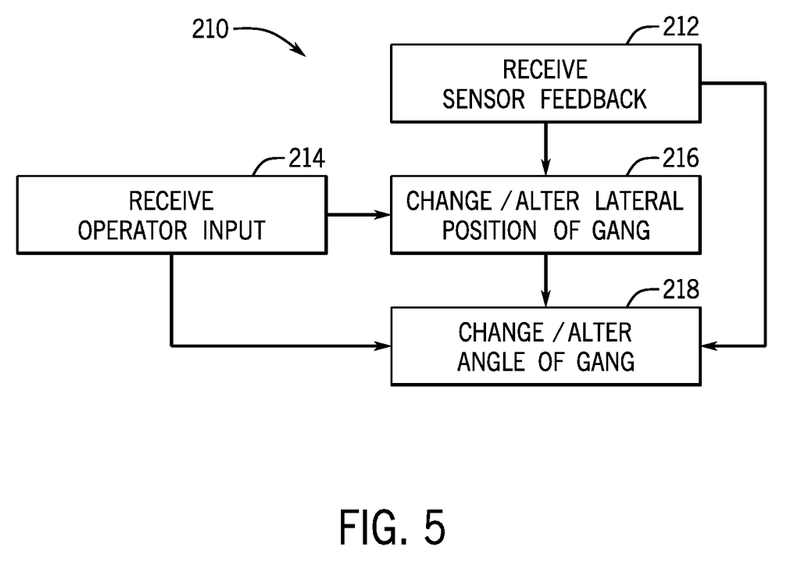
FIG. 5 is a method for altering a position of a disk gang, in accordance with aspects of the present disclosure.

FIG. 5 is a method 210 for altering a position of one or more disk gangs (e.g., gangs 48 in FIGS. 1-4). One or more steps of the method 210 may be performed by a computing device (e.g., controller 204 in FIGS. 3 and 4), a lateral adjustment mechanism, and/or an angular adjustment mechanism of an agricultural implement. One or more steps of the method 210 may be performed simultaneously or in a different order from that depicted in FIG. 5.

The method 210 includes receiving feedback form sensors coupled to an agricultural implement (block 212). The sensors may be position sensors (e.g., Hall-effect linear-displacement transducer, magnetostrictive transducer, etc.), pressure sensors, infrared sensors, radio detection and ranging sensors, light detection and ranging (lidar) sensors, ultrasonic sensors, capacitance sensors, and/or other types of sensors. The sensors embodiments, some of the sensors 202 are configured to detect an angle of the gangs (as well as associated blades), to detect a lateral position of the gangs, to detect a spatial relationship of the gangs relative to each other, and/or to detect a height between the agricultural implement and the soil. The method 210 may also include receiving an operator input (block 214). The operator input may relate to a desired angle for one or more gangs (and their associated disc blades) and/or to a desired lateral position for one or more gangs.

The method 210 further includes changing or altering, via a lateral adjustment mechanism, a lateral position of one or more disc gangs relative to at least one other disc gang on the agricultural implement or relative to a center line of a main frame of the agricultural implement (block 216). The method 210 even further includes altering, via an angular adjustment mechanism, an angle of one or more disc gangs relative to a front portion or a rear portion of the main frame while the lateral adjustment mechanism maintains the lateral position of the one or more disc gangs relative to the at least one other disc gang or relative to the center line as the angle of the one or more disc gangs is changed over a range of different angles (block 218).

In steps 216 and 218, one or more control signals may be provided by a controller (e.g., to the lateral adjustment mechanism and/or to the angular adjustment mechanism) to change/alter the lateral position of the gang and to change/alter the angle of the gang in response to the sensor feedback and/or operator inputs. Steps 216 may occur before step 218, step 218 may occur before step 216, or steps 216 and 218 may occur at the same time. Both steps 216 and 218 may occur during operation of the agricultural implement (e.g., in the field).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural implement, comprising:
a main frame;
a first frame member assembly coupled to the main frame;
a first plurality of discs coupled to the first frame member assembly;
a first linkage assembly coupled to the first frame member assembly; and
a first lateral adjustment mechanism coupled to the first frame member assembly and configured to actuate the first linkage assembly to change a first lateral position of the first plurality of discs relative to at least one other plurality of discs coupled to the main frame or relative to a center line of the main frame, the center line being parallel to a direction of travel of the agricultural implement; and
wherein the first frame member assembly comprises a first frame member pivotably coupled to a second frame member, the first frame member being parallel to the second frame member along a horizontal plane, and the first lateral adjustment mechanism is configured to shift the first frame member laterally relative to the second frame member.

2. The agricultural implement of claim 1, wherein the main frame comprises a front portion and a rear portion relative to the direction of travel, and wherein the first lateral adjustment mechanism is configured to maintain the first lateral position of the first plurality of discs relative to the at least one other plurality of discs or relative to the center line as an angle of the first plurality of discs is changed relative to the center line or the direction of travel over a range of different angles.

3. The agricultural implement of claim 2, further comprising an angular adjustment mechanism configured to change the angle of the first plurality of discs.

4. The agricultural implement of claim 3, wherein the angular adjustment mechanism is coupled to both the main frame and the first frame member assembly.

5. The agricultural implement of claim 1, wherein the first lateral adjustment mechanism is configured to shift the first frame member laterally in a first direction and to shift the second frame member laterally in a second direction opposite the first direction.

6. The agricultural implement of claim 1, wherein the first linkage assembly comprises a first linkage connection coupled to a first longitudinal end of the first frame member assembly and a second linkage connection coupled to a second longitudinal end of the first frame member assembly, and the first lateral adjustment mechanism is coupled to the first frame member assembly via the first linkage connection.

7. The agricultural implement of claim 1, wherein the first lateral adjustment mechanism comprises a turnbuckle, a cylinder, or an actuator.

8. The agricultural implement of claim 1, further comprising:
  a second frame member assembly coupled to the main frame;
  a second plurality of discs coupled to the second frame member assembly;
  a second linkage assembly coupled to the second frame member assembly; and
  a second lateral adjustment mechanism coupled to the second frame member assembly and configured to actuate the second linkage assembly to change a second lateral position of the second plurality of discs relative to the first plurality of discs or relative to the center line of the main frame.

9. The agricultural implement of claim 8, wherein the main frame comprises a front portion and a rear portion relative to the direction of travel, both the first plurality of discs and the second plurality of discs are located adjacent the rear portion of the main frame, and the first plurality of discs and the second plurality of discs are located at a same longitudinal location along the center line.

10. The agricultural implement of claim 1, wherein the main frame comprises a front portion and a rear portion relative to the direction of travel, the at least one other plurality of discs comprises a second plurality of discs, the second plurality of discs is located adjacent the front portion of the main frame, the first plurality of discs is located adjacent the rear portion of the main frame, the first plurality of discs and the second plurality of discs are aligned in a direction from the front portion to the rear portion, and the first lateral adjustment mechanism is configured to change both an index and a blade overlap between respective blades of the first plurality of discs and the second plurality of discs.

11. The agricultural implement of claim 10, further comprising sensors configured to detect a spatial relationship of the first plurality of discs relative to the second plurality of discs, and a controller configured to alter the spatial relationship of the first plurality of discs relative to the second plurality of discs during operation of the agricultural implement based on feedback from the sensors.

12. A system for altering a position of a disc gang, comprising:
  a frame member assembly configured to couple to a main frame of an agricultural implement, the main frame having a front portion and a rear portion relative to a direction of travel of the agricultural implement;
  the disc gang comprising a plurality of discs, wherein the disc gang is coupled to the frame member assembly;
  a linkage assembly coupled to the frame member assembly;
  sensors configured to detect a spatial relationship of the disc gang relative to at least one other disc gang coupled to the main frame;
  a controller configured to alter the spatial relationship of the disc gang relative to the at least one other disc gang during operation of the agricultural implement based on feedback from the sensors;
  an angular adjustment mechanism configured to change an angle of the disc gang relative to the front portion or the rear portion of the main frame; and
  a lateral adjustment mechanism coupled to the frame member assembly and configured to actuate the linkage assembly to change a lateral position of the disc gang relative to at least one other disc gang coupled to the main frame or relative to a center line of the main frame, the center line being parallel to the direction of travel of the agricultural implement, and wherein the lateral adjustment mechanism is configured to maintain the lateral position of the disc gang relative to the at least one other disc gang or relative to the center line as the angle of the disc gang is changed over a range of different angles in response to control signals from the controller based on the feedback from the sensors.

13. The system of claim 12, wherein the angular adjustment mechanism is coupled to both the main frame and the frame member assembly.

14. The system of claim 12, wherein the frame member assembly comprises a first frame member pivotably coupled to a second frame member, the first frame member being parallel to the second frame member along a horizontal plane, and the lateral adjustment mechanism is configured to shift the first frame member laterally relative to the second frame member.

15. The system of claim 14, wherein the lateral adjustment mechanism is configured to shift the first frame member laterally in a first direction and to shift the second frame member laterally in a second direction opposite the first direction.

16. The system of claim 12, wherein the linkage assembly comprises a first linkage connection coupled to a first longitudinal end of the frame member assembly and a second linkage connection coupled to a second longitudinal end of the frame member assembly, and the lateral adjustment mechanism is coupled to the frame member assembly via the first linkage connection.

17. A method for altering a position of a disc gang on an agricultural implement, comprising:
  changing, via a lateral adjustment mechanism, a lateral position of the disc gang relative to at least one other disc gang on the agricultural implement or relative to a center line of a main frame of the agricultural implement, the center line being parallel to a direction of travel of the agricultural implement, wherein the lateral adjustment mechanism is coupled to a frame member assembly, the disc gang is coupled to the frame member assembly, and the disc gang comprises a plurality of discs; and
  altering, via an angular adjustment mechanism, an angle of the disc gang relative to a front portion or a rear portion of the main frame while the lateral adjustment mechanism maintains the lateral position of the disc gang relative to the at least one other disc gang or relative to the center line as the angle of the disc gang is changed over a range of different angles in response to control signals from a controller based on feedback from sensors detecting a spatial relationship of the disc gang relative to at least one other disc gang coupled to the main frame, wherein the controller is configured to alter the spatial relationship of the disc gang relative to the at least one other disc gang during operation of the agricultural implement based on feedback from the sensors.

18. The method of claim 17, wherein changing the lateral position comprises actuating, via the lateral adjustment mechanism, a linkage assembly coupled to the frame member assembly to change the lateral position of the disc gang relative to at least one other disc gang on the agricultural implement or relative to the center line of the main frame.

19. The method of claim 17, comprising both changing the lateral position of the disc gang and altering the angle of the disc gang during operation of the agricultural implement.

* * * * *